US009911460B2

(12) United States Patent
Dandu et al.

(10) Patent No.: US 9,911,460 B2
(45) Date of Patent: Mar. 6, 2018

(54) FAST AND SMART VIDEO TRIMMING AT FRAME ACCURACY ON GENERIC PLATFORM

(71) Applicant: Microsoft Corporation, Redmond, WA (US)

(72) Inventors: Srinivas Dandu, Bellevue, WA (US); Yongjun Wu, Bellevue, WA (US); Shankaranand Arunachalam, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 869 days.

(21) Appl. No.: 14/285,613

(22) Filed: May 22, 2014

(65) Prior Publication Data

US 2015/0269967 A1  Sep. 24, 2015

Related U.S. Application Data

(60) Provisional application No. 61/969,744, filed on Mar. 24, 2014.

(51) Int. Cl.
| | |
|---|---|
| *H04N 7/12* | (2006.01) |
| *G11B 27/031* | (2006.01) |
| *H04N 19/48* | (2014.01) |
| *H04N 9/87* | (2006.01) |
| *G11B 27/00* | (2006.01) |

(Continued)

(52) U.S. Cl.
CPC ............ *G11B 27/031* (2013.01); *G11B 27/00* (2013.01); *H04N 9/87* (2013.01); *H04N 19/107* (2014.11); *H04N 19/196* (2014.11); *H04N 19/48* (2014.11)

(58) Field of Classification Search
CPC ........ H04N 19/48; H04N 9/87; H04N 19/148; G11B 27/00
USPC ...................................... 375/240.26
See application file for complete search history.

(56) References Cited

U.S. PATENT DOCUMENTS

| | | | | |
|---|---|---|---|---|
| 6,032,156 | A * | 2/2000 | Marcus | ............. G06F 17/30029 |
| 6,683,911 | B1 * | 1/2004 | Inoue | ................... G11B 27/036 |
| | | | | 348/423.1 |
| 7,756,205 | B2 | 7/2010 | Toma et al. | |

(Continued)

FOREIGN PATENT DOCUMENTS

WO   WO2005/120060   12/2005

OTHER PUBLICATIONS

International Preliminary Report on Patentability in PCT Patent Application No. PCT/US2015/021618, dated Jun. 16, 2016, 7 Pages.

(Continued)

*Primary Examiner* — Tung Vo
(74) *Attorney, Agent, or Firm* — Klarquist Sparkman, LLP

(57) ABSTRACT

In a computing device that implements an encoder, a method comprises receiving an encoded video sequence with a file container, receiving input to execute a trimming operation to create a frame accurate target segment of one or more desired pictures from the encoded video sequence and trimming to frame accuracy. Trimming to frame accuracy is accomplished by changing the parameter identifications of leading and trailing portions, if supported, or changing the parameters, and using the changed parameters or parameter identifications in re-encoding the leading and trailing portions, while an untouched middle portion between the leading and trailing portions is re-muxed without re-encoding.

12 Claims, 11 Drawing Sheets

(51) Int. Cl.
*H04N 19/196* (2014.01)
*H04N 19/107* (2014.01)

(56) References Cited

U.S. PATENT DOCUMENTS

| | | | |
|---|---|---|---|
| 8,165,457 B2 | 4/2012 | Shibutani et al. | |
| 8,311,106 B2 | 11/2012 | Ahn et al. | |
| 8,457,474 B2 | 6/2013 | Hattori | |
| 8,472,731 B2 | 6/2013 | Suzuki et al. | |
| 8,488,943 B1 | 7/2013 | Sharifi | |
| 2002/0126754 A1* | 9/2002 | Shen | H04N 21/23424 375/240.12 |
| 2004/0064371 A1 | 4/2004 | Crapo | |
| 2005/0244005 A1 | 11/2005 | Grigorovitch et al. | |
| 2006/0165298 A1 | 7/2006 | Kikuchi | |
| 2006/0233245 A1* | 10/2006 | Chou | G11B 27/031 375/240.12 |
| 2009/0202219 A1* | 8/2009 | Kashima | G11B 27/034 386/278 |
| 2011/0058792 A1 | 3/2011 | Towner et al. | |
| 2012/0230433 A1 | 9/2012 | Chen et al. | |
| 2013/0039433 A1 | 2/2013 | Ralston et al. | |
| 2013/0195171 A1 | 8/2013 | Wang et al. | |
| 2013/0215978 A1 | 8/2013 | Wu et al. | |
| 2013/0275557 A1 | 10/2013 | Myers et al. | |
| 2014/0064384 A1 | 3/2014 | Wang | |
| 2014/0092966 A1* | 4/2014 | Kazui | H04N 19/503 375/240.12 |
| 2015/0269967 A1* | 9/2015 | Dandu | G11B 27/031 386/278 |
| 2016/0255359 A1* | 9/2016 | Yu | H04N 19/105 |

OTHER PUBLICATIONS

Written Opinion of the International Preliminary Examining Authority Issued in PCT Patent Application No. PCT/US2015/021618, dated Feb. 10, 2016, 6 Pages.

International Search Report and Written Opinion Issued in PCT Patent Application No. PCT/US2015/021618, dated Jun. 17, 2015, 9 Pages.

Mesander, B., "The H.264 Sequence Parameter Set," http://cardinalpeak.com/blog/the-h-264-sequence-parameter-set/ (Apr. 20, 2011).

ISO/IEC, "Information Technology—Coding of Audio-Visual Objects—Part 12: ISO Base Media File Format," ISO/IEC 14496-12, 120 pp. (Oct. 2008).

ISO/IEC, "Information Technology—Coding of Audio-Visual Objects—Part 14: MP4 File Format," ISO/IEC 14496-14, 18 pp. (Nov. 2003).

ISO/IEC, "Information Technology—Coding of Audio-Visual Objects—Part 15: Advanced Video Coding (AVC) File Format," ISO/IEC 14496-15, 29 pp. (Apr. 2004).

ITU-T, "Series H. Audiovisual and Multimedia Systems, Infrastructure of audiovisual services—Coding of moving video, Advanced video coding for generic audiovisual services" H.264, 676 pp. (Mar. 2010).

Weigand, T. et al., "Overview of the H.264 / AVC Video Coding Standard," *IEEE Transactions of Circuits and Systems for Video Technology*, 19 pages (Jul. 2003).

* cited by examiner software 180 implementing fast and smart
trimming of media content

FAST AND SMART VIDEO TRIMMING AT FRAME ACCURACY ON GENERIC PLATFORM

CROSS REFERENCE TO RELATED APPLICATION

This application claims the benefit of U.S. Provisional Patent Application No. 61/969,744, filed Mar. 24, 2014, which is hereby incorporated by reference.

BACKGROUND

Engineers use compression (also called source coding or source encoding) to reduce the bitrate of digital video. Compression decreases the cost of storing and transmitting video information by converting the information into a lower bitrate form. Decompression (also called decoding) reconstructs a version of the original information from the compressed form. A "codec" is an encoder/decoder system.

A media container format specifies how to organize encoded media content for storage, transmission, etc. A media container format can specify metadata about the encoded media content, timing information, digital rights management information, error correction information or other information. Various container formats have been promulgated for multimedia content, including MPEG-2 TS/PS, Advanced Systems Format ("ASF") (formerly Advanced Streaming Format), MPEG-4 ("MP4") as defined in ISO/IEC 14496-12 (ISO base media file format), 14496-14 (MP4 file format) and 14496-15 (AVC file format), Common File Format ("CFF") and Matroska Video Format ("MKV"). The specification for a container format such as MP4 or CFF defines how to organize encoded media content and add metadata for encoded media content so that a media file is conformant with the container format. A container format specification typically defines options for the syntax of a media file in the container format, detailing the meaning and organization of parameters in the media file when particular features are used. In some cases, a container format specification may also provide details about operations to be performed by a container format sink or container format source. A container format sink puts encoded media content in an elementary media bitstream and metadata (e.g., from a media encoder such as an audio encoder or video encoder) into a media file according to a container format. A container format source parses the media file in the container format and provides the elementary media bitstream to a media decoder for decoding together with metadata.

Every day, millions of media files in container formats are produced by diverse sources. Even more media files in container formats are consumed by different users through assorted activities. Increasingly, users seek to edit media content, such as to edit a video so that only a desired frame or frames are retained, which is also referred to as trimming, rendering or smart editing. As one example, a user of a mobile device such as a smart phone may seek to extract a single picture from a video he or she recorded. Full transcoding, which would involve decoding and re-encoding, is too time and resource intensive and can result in loss of fidelity. But other conventional editing methods other than full transcoding do not allow for sufficient accuracy and/or implementation in the mobile device environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one implementation, in a computing device that implements an encoder, a method comprises receiving an encoded video sequence with a file container, receiving input to execute a trimming operation to create a frame accurate target segment of one or more desired pictures from the encoded video sequence and trimming to frame accuracy. Trimming to frame accuracy is accomplished by changing the parameters or the parameter identifications of leading and trailing portions, using the changed parameters or parameter identifications in re-encoding the leading and trailing portions and re-muxing a middle portion between the leading and trailing portions without re-encoding.

The foregoing and other objects, features, and advantages will become more apparent from the following detailed description, which proceeds with reference to the accompanying figures.

DETAILED DESCRIPTION

Figure 1:
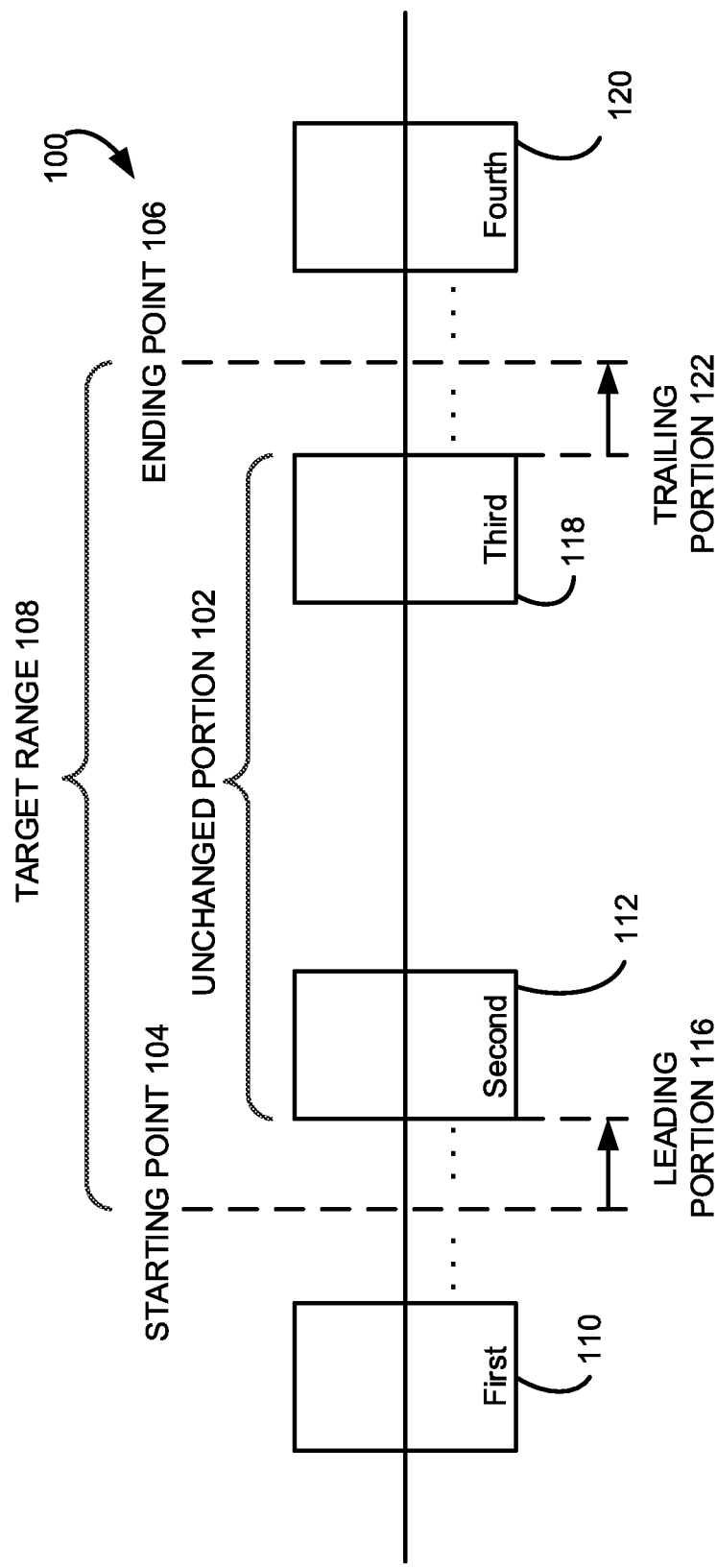
FIGS. 1 and 2 are diagrams showing a media content stream being trimmed according to one implementation to produce a target having one or more desired pictures in sequence.

FIG. 1 is a diagram schematically illustrating a representative fast and smart trimming operation being carried out on media content, such as an encoded video stream 100, i.e., a stream of pictures. In the example of FIG. 1, the encoded video stream 100 is received, and input specifying a portion or portions for trimming is also received. In the example of FIG. 1, input specifying a target range starting point 104 and a target range ending point 106, together defining a target range 108, is received. As is further described below, the fast and smart trimming operation determines first and second clear start pictures 110, 112, occurring before and after the target range starting point 104, respectively, within the stream of pictures. Clear start pictures, which include IDR (Instantaneous Decoder Refresh) pictures, do not rely on any previous pictures to define subsequent pictures. A leading portion 116 of the target range is defined to extend from the target range starting point 104 to the second clear start picture 112. In addition, third and fourth clear start pictures 118, 120, occurring before and after the target range ending point 106 within the stream of pictures, are determined. A trailing portion 122 of the target range is defined to extend from the third clear start picture 118 to the target range ending point 106. As is shown by the ellipses, there may be additional non-clear start pictures (e.g., P pictures) between the first and second clear start pictures 110, 112 and between the third and fourth clear start pictures 118, 120. A segment 102, also referred to as the unchanged portion, untouched portion or middle portion, extends between the leading portion 116 and the trailing portion 122.

Figure 2:
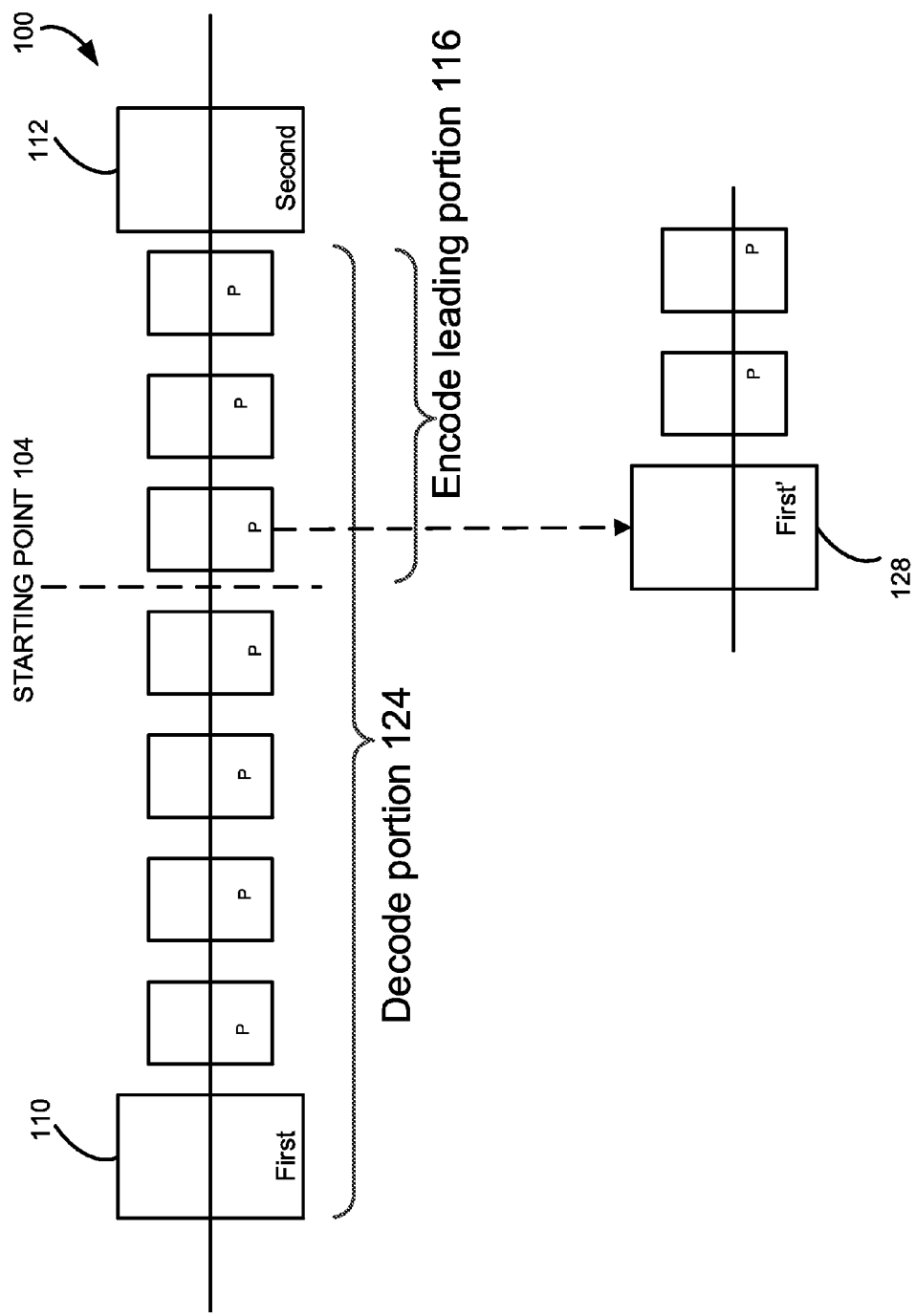

FIG. 2 is a diagram schematically illustrating a segment of the encoded video stream 100 from FIG. 1 in more detail. In particular, a portion 124 extending from the first clear start picture 110 to the second clear start picture 112 is shown, together with intervening pictures, which in this example includes seven P pictures. To achieve frame accuracy in the target, the portion 124 is decoded so that the dependent P picture immediately following the target range starting point 104 can be defined with reference to the first clear start picture 110. As also depicted in FIG. 2, the leading portion 116 from the target range starting point 104 to the second clear start picture 112 is re-encoded. In the resulting re-encoded leading portion of the target, a new clear start picture, First' 128, has been created and inserted as the leading picture, which ensures that the pictures in the target will be processed in their proper sequence.

Figure 3:
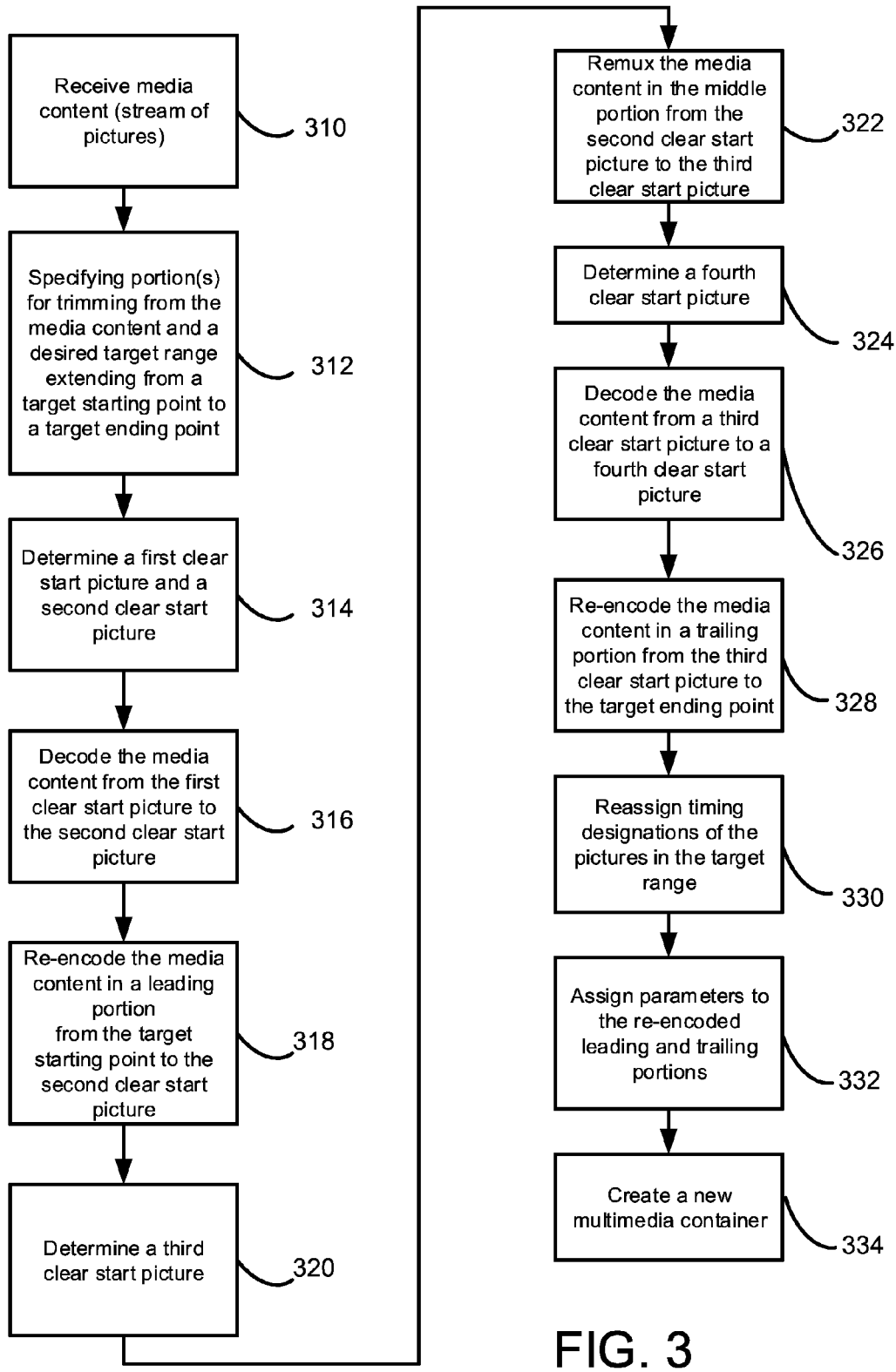
FIGS. 3 and 4 are flow charts showing steps of method implementations for trimming a media content stream to achieve a frame accurate target.

FIG. 3 is a flow chart of a method for fast and smart trimming according to one implementation. In process block 310, media content, such as in the form of an encoded video sequence or stream of pictures, is received. In process block 312, the desired target range is specified, which in effect specifies at least one portion of pictures from the video sequence to be retained after trimming is complete. The target range can be specified by a target range starting point and a target range ending point. Other forms of designating the desired target range can also be used.

In process block 314, a first clear start picture, defined as the first clear start picture preceding the target range starting point, is determined. Similarly, a second clear start picture, defined as the first clear start picture following the target range starting point, is determined. In process block 316, the pictures from the first clear start picture to the second clear start picture are decoded. In process block 318, a leading portion of the segment from the target range starting point to the second clear start picture is re-encoded.

In process block 320, a third clear start picture, defined as the first clear start picture preceding the target range ending point, is determined. In process block 322, the pictures from the second clear start picture to the third clear start picture are re-muxed without any transcoding. Thus, this portion is referred to as the unchanged portion, the untouched portion or the middle portion.

In process block 324, a fourth clear start picture, defined as the first clear start picture following the target range ending point, is determined. In process block 326, the pictures from the third clear start picture to the fourth clear start picture are decoded. In process block 328, a trailing portion of the target from the third clear start picture to the target range ending point is re-encoded.

In process block 330, timing designations, e.g., timestamps, of the pictures in the target range are adjusted. Typically, the timing designations are adjusted so that the target range begins at time t=0 and continues in sequence.

In process block 332, parameters are assigned to the re-encoded leading portion and re-encoded trailing portion. In process block 334, a new multimedia container describing the re-encoded leading portion, the re-muxed but unchanged middle portion and the re-encoded trailing portion is created.

Figure 4:
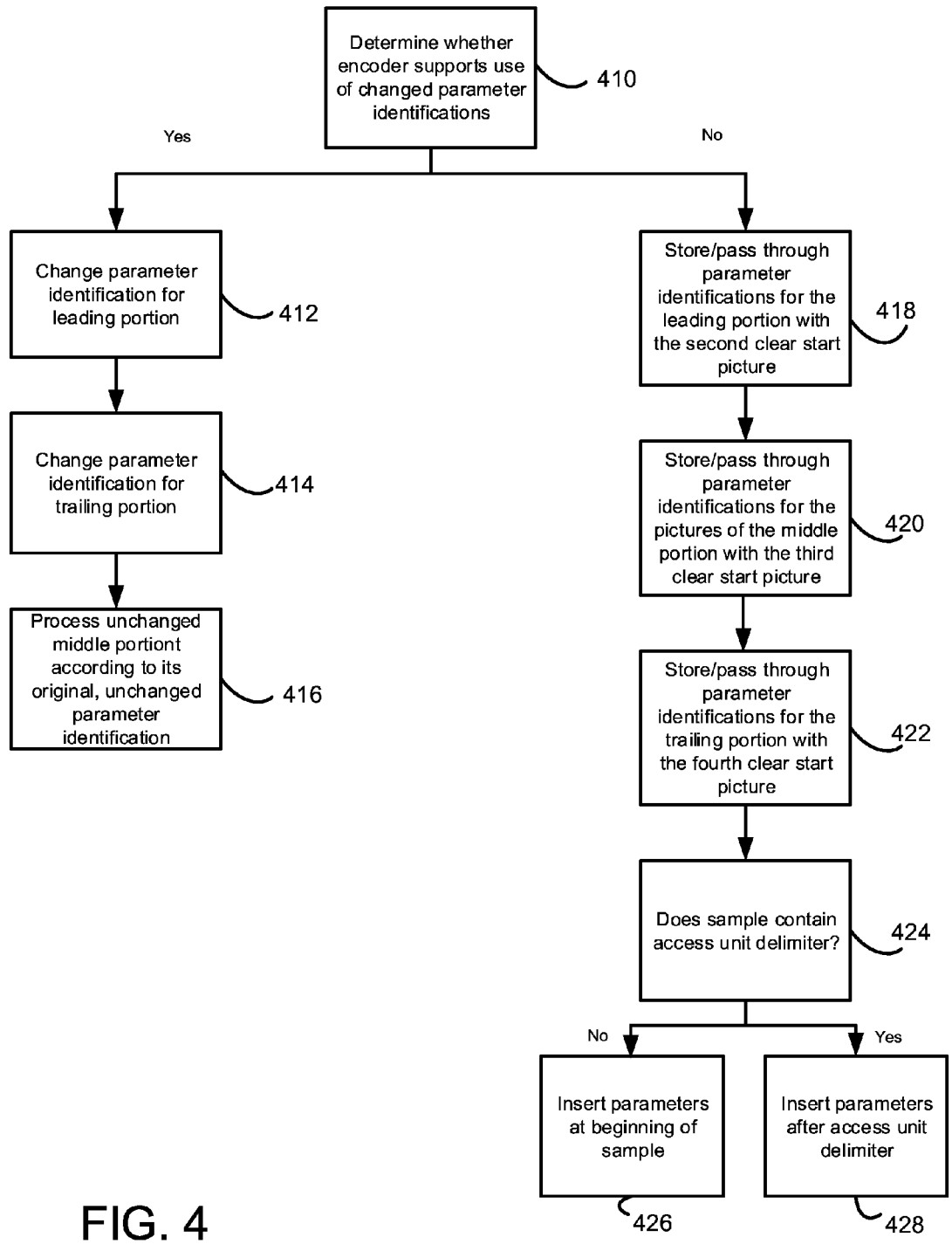

FIG. 4 is a flowchart further defining steps taken in the fast and smart trimming process depending upon the encoder capabilities. In process block 410, it is determined whether the encoder supports the use of multiple parameter identifications. One type of parameter of interest is the stream parameter, including, e.g., a sequence parameter set (SPS) and a picture parameter set (PPS). In some implementations, process block 410 determines whether the encoder can support multiple SPS identifications and/or multiple PPS identifications.

If the answer in process block 410 is yes, then in process block 412 the parameter identification for the leading portion of the target range is changed. In process block 414, the parameter identification for the trailing portion is changed. In this way, the parameter identifications for the leading portion and the trailing portion have been changed so that they differ from the parameter identification for unchanged or middle portion. In step 416, the middle portion is processed according to its original, unchanged parameter identification.

If the answer in process block 410 is no, and the encoder does not support changed parameter identifications, then the parameter identifications for each of the leading portion, the middle portion and the trailing portion are passed through and stored, in association with the respective clear start pictures, as indicated in process blocks 418, 420 and 422, respectively. In process block 424, it is determined whether the current sample contains an access unit delimiter. If the answer in process block 424 is no, then in process block 426 the parameters are inserted at the beginning of the sample. If the answer in process block 424 is yes, i.e. the current sample does contain an access unit delimiter, then in process block 428 the parameters are inserted after the access unit delimiter.

FIGS. 5A, 5B, 5C and 6 illustrate a first solution to managing the timing designations in the target so that the pictures in the target range are properly identified and sequenced. FIGS. 7A, 7B, 7C and 8A illustrate a second solution.

Figure 5A:
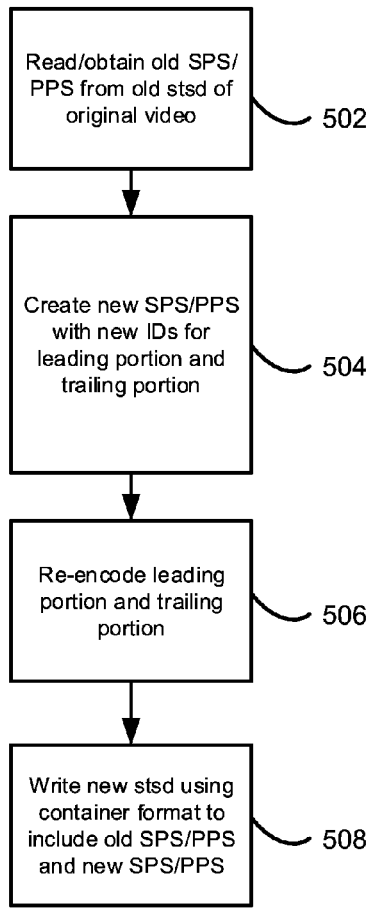
FIG. 5A is a flow chart showing a method for frame accurate trimming by setting new parameter identifications.
Figure 5B:
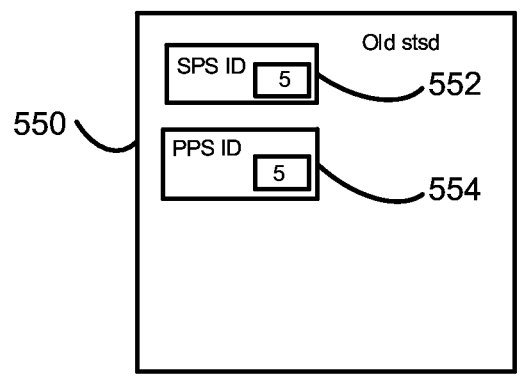
FIGS. 5B and 5C are diagrams showing a representative data structure storing the parameter identifications of the original media content stream before trimming and for the target after trimming, respectively.

FIG. 5A is a flow chart of a method for managing the timing designations of the pictures in the target if the encoder supports use of multiple parameter set identifications. In process block 502, parameters are read from a data structure associated with the original media content stream (original video). In some implementations, the parameters are the stream parameters, and in particular, the SPS identification and the PPS identification. In some implementations, the stream parameters are read from a sample description box or container associated with the original media content stream. In the example of FIG. 5A, the sample description box for the original media content stream or original video is referred to as the "old stsd." FIG. 5B is a diagram showing a schematic depiction of an old stsd 550 having a SPS identification container 552 and a PPS identification container 554. In the example of FIG. 5B, the SPS identification is "5," and the PPS identification is also "5."

In process block 504, a new SPS and a new PPS having new identifications are created for both the leading portion and the trailing portion. In process block 506, the leading and trailing portions of the target are re-encoded.

Figure 5C:
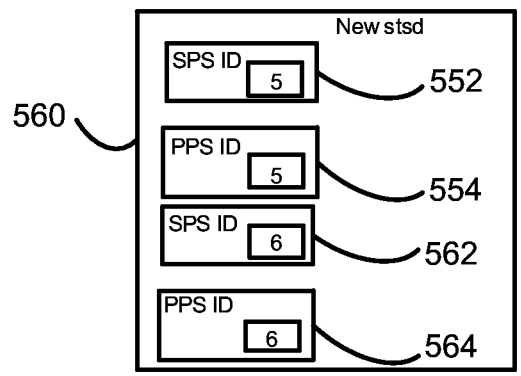

In process block 508, the new parameters are written, i.e., a new stsd is created that includes the parameters from the old stsd as well as the newly created parameters. FIG. 5C shows a "new stsd" 560 in which a new SPS having an identification of "6" and a new PPS having an identification of "6" have been saved in respective containers 562, 564, together with the containers 552, 554 from the old stsd.

Figure 6:
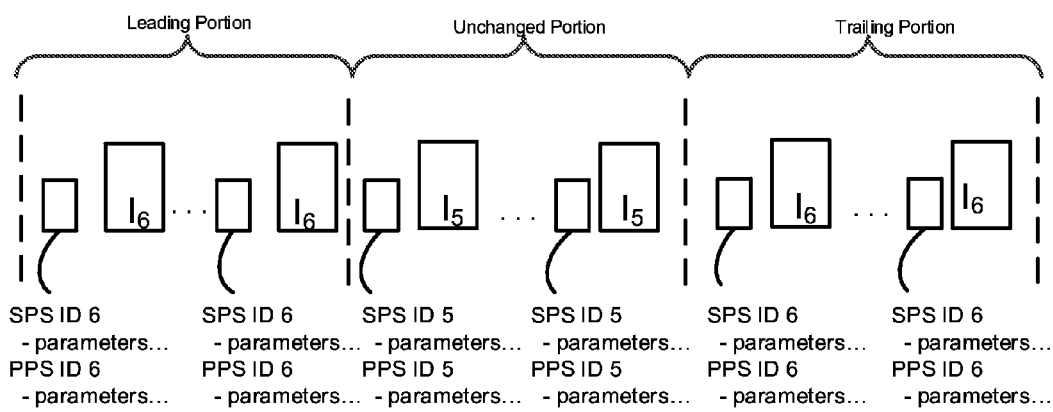
FIG. 6 is a diagram showing the pictures of the target as formatted to have parameter identifications for the leading portion and for the trailing portion that differ from the parameter identifications for the untouched portion.

FIG. 6 is a diagram showing the resulting target sequence in which the new SPS and PPS parameters having respective new identifications of "6" have been stored with clear start pictures of the leading portion and the trailing portion. A middle or untouched portion of the target retains the original SPS and PPS parameter identifications, each of which is "5."

Figure 7A:
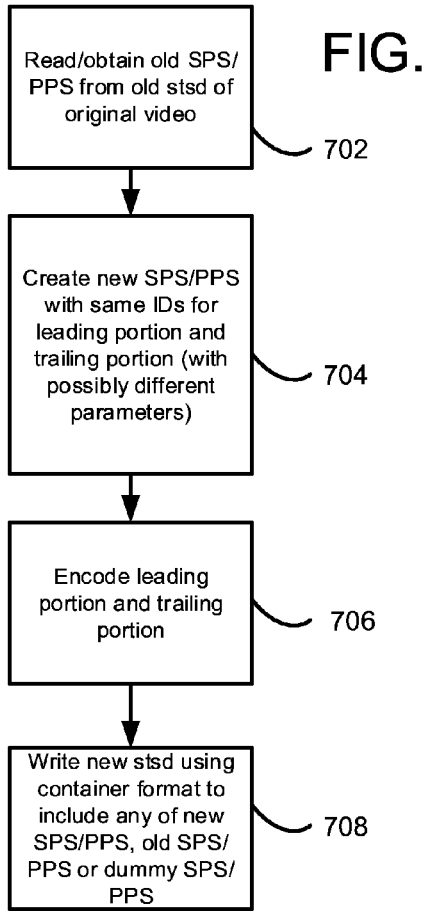
FIG. 7A is a flow chart showing a method of frame accurate trimming by creating new parameter sets.
Figure 7B:
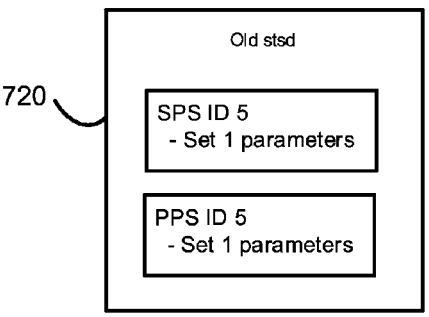
FIG. 7B is a diagram showing a representative data structure storing the parameter identifications and parameter sets of the original media content stream before trimming.

FIG. 7A is a flow chart of another method for managing the timing designations of the pictures in the target which can be used if the encoder does not support using multiple parameter identifications. In process block 702, the parameters for the original video are read, such as from an old stsd. FIG. 7B is a diagram showing a schematic depiction of an old stsd 720 having a SPS with an identification of "5" and a set of parameters, referred to here as the "Set 1" parameters. As also shown in FIG. 7B, there is a PPS with an identification of "5" and a set of parameters, referred to here as the "Set 1" parameters.

Figure 7C:
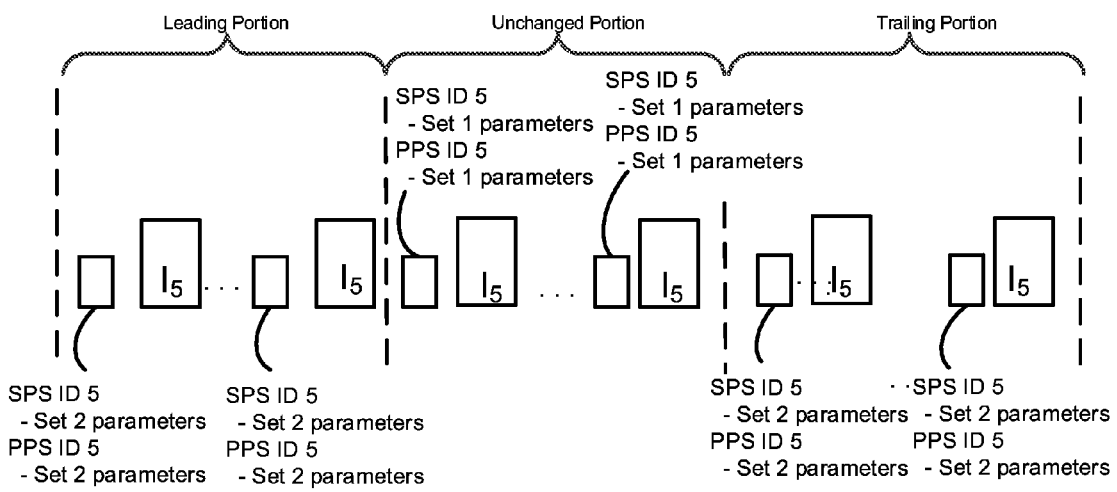
FIG. 7C is a diagram showing the pictures of the target as formatted to have parameters passed through and stored with the pictures of the target.

In process block 704, new SPS and PPS parameter sets having the same identifications as the original parameter sets are created. FIG. 7C is a diagram showing the resulting target sequence and the parameter sets that have been inserted and stored with the clear start pictures. In the leading and trailing portions, the parameter sets have the same identifications (SPS ID 5 and PPS ID5) as the parameter sets in the original video, but the parameters are new Set 2 parameters. In the middle or untouched portion of the target, the target retains the original SPS ID 5 and PPS ID 5 each having the respective Set 1 parameters.

Figure 8A:
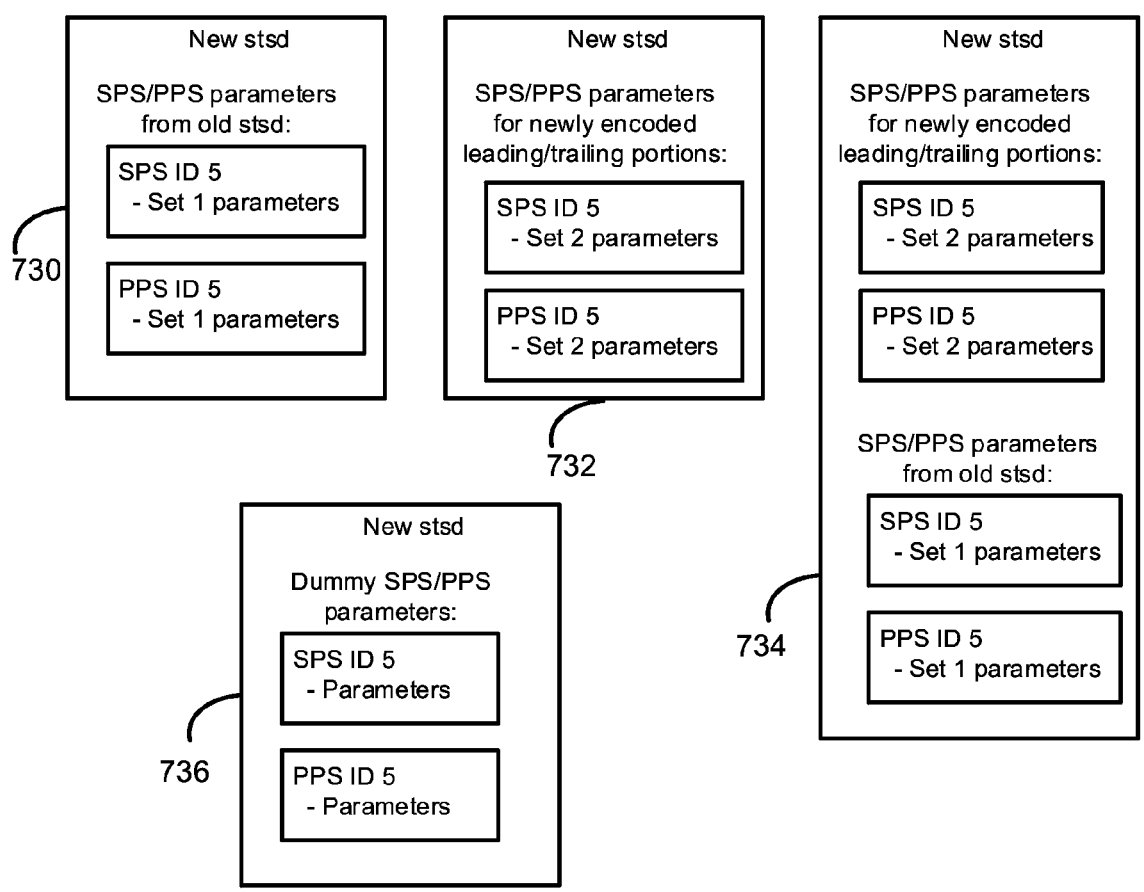
FIG. 8A is a diagram showing representative data structures storing the parameter identifications and parameter sets after trimming according to multiple examples.

In some implementations, the parameters in the new stsd or other data structure are not used, and only the parameters in the picture stream are used. As a result, the new parameter sets may have the same parameters as the original parameter sets, new parameters, multiple parameter sets or even dummy or placeholder parameters. Some of the options are shown in FIG. 8A. A new stsd 730 is an example of a new stsd with the Set 1 parameters from the old stsd. A new stsd 732 is an example of a new stsd with new parameters (i.e., Set 2 parameters). A new stsd 734 is an example of a stsd having multiple parameter sets (e.g., new Set 2 parameters and the original Set 1 parameters from the old stsd). A new stsd 736 is an example of a new stsd having dummy or placeholder parameters.

Figure 8B:
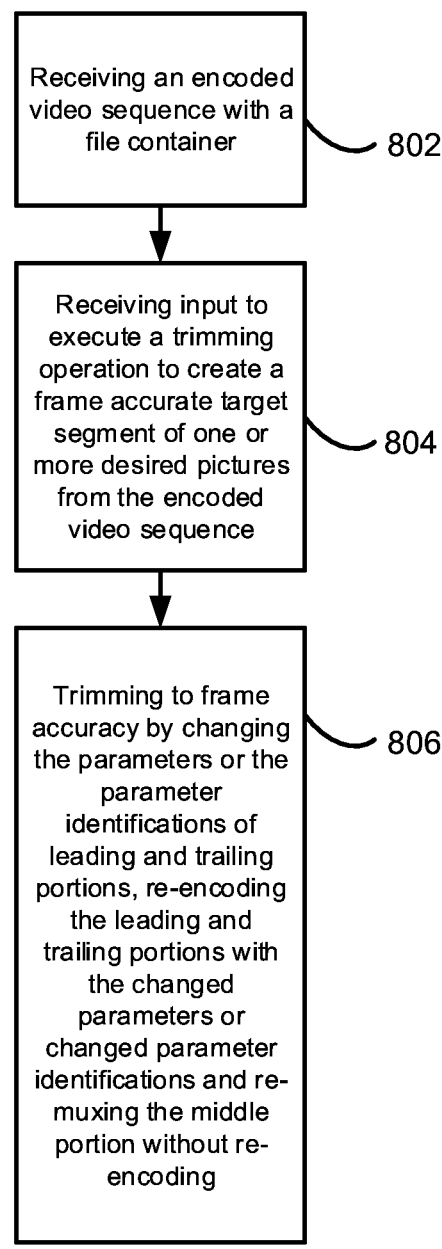
FIG. 8B is a flow chart showing a method of frame accurate trimming according to another implementation.

According to an implementation as shown in FIG. 8B, trimming to frame accuracy in a computing device that implements an encoder comprises receiving an encoded video sequence with a file container (process block 802) and receiving input to execute a trimming operation to create a frame accurate target segment of one or more desired pictures from the encoded video sequence (process block 804) and trimming to frame accuracy by changing the parameters or the parameter identifications of leading and trailing portions (process block 806). The changed parameters or changed parameter identifications are used in re-encoding the leading and trailing portions, and an unchanged middle portion between the leading and trailing portions is re-muxed without re-encoding.

Example Computing Environment

Figure 10:
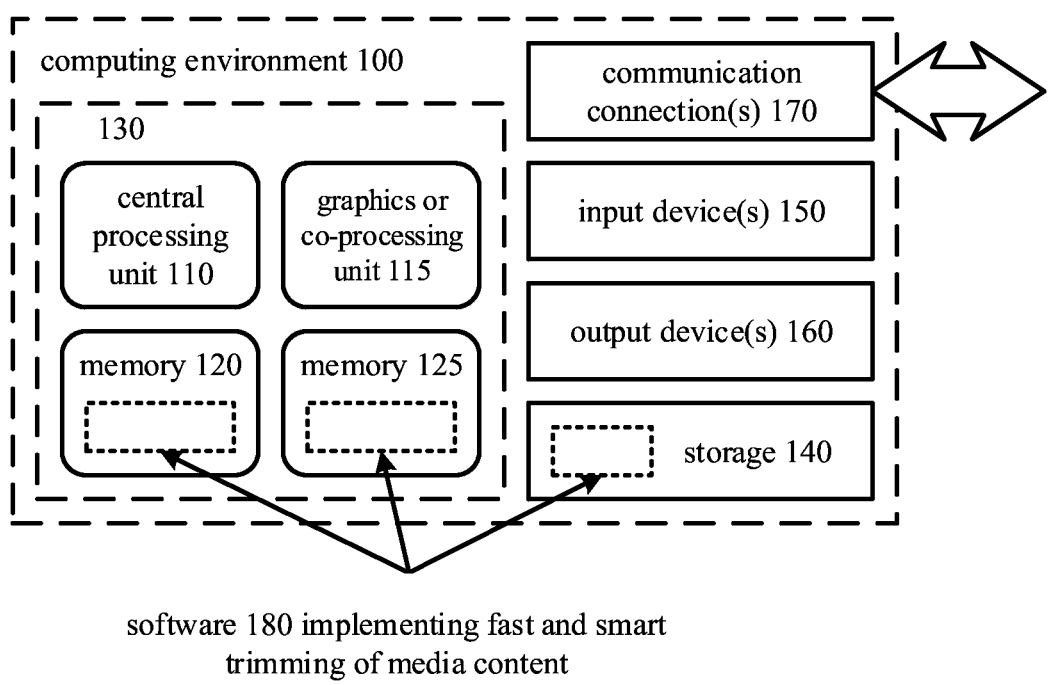
FIG. 10 is a diagram of an example computing system in which some described embodiments can be implemented.

FIG. 10 illustrates a generalized example of a suitable computing environment (100) in which several of the described techniques and tools may be implemented. The computing environment (100) is not intended to suggest any limitation as to scope of use or functionality, as the techniques and tools may be implemented in diverse general-purpose or special-purpose computing environments.

With reference to FIG. 10, the computing environment (100) includes one or more processing units (110, 115) and memory (120, 125) that can be used in implementing a computing device. In FIG. 10, this most basic configuration (130) is included within a dashed line. The processing units (110, 115) execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit (110) as well as a graphics processing unit or co-processing unit (115). The memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for decoder optimization, in the form of computer-executable instructions suitable for execution by the processing unit(s).

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The tangible storage (140) may be removable or non-removable, and includes magnetic disks, magnetic tapes or cassettes, CD-ROMs, DVDs, or any other medium which can be used to store information in a non-transitory way and which can be accessed within the computing environment (100). The storage (140) can store instructions for the software (180) implementing one or more innovations for decoder optimization.

The input device(s) (150) may be a touch input device such as a keyboard, mouse, pen, or trackball, a voice input device, a scanning device, or another device that provides input to the computing environment (100). For video decoding, the input device(s) (150) may be a video card, TV tuner card, or similar device that accepts video input in analog or digital form, or a CD-ROM or CD-RW that reads video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, or other carrier.

The techniques and tools can be described in the general context of computer-readable media. Computer-readable media are any available tangible media that can be accessed within a computing environment. By way of example, and not limitation, with the computing environment (100), computer-readable media include memory (120), storage (140), and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "select" to describe computer operations in a computing environment. These terms are high-level abstractions for operations performed by a computer, and should not be confused with acts performed by a human being. The actual computer operations corresponding to these terms vary depending on implementation.

Figure 9:
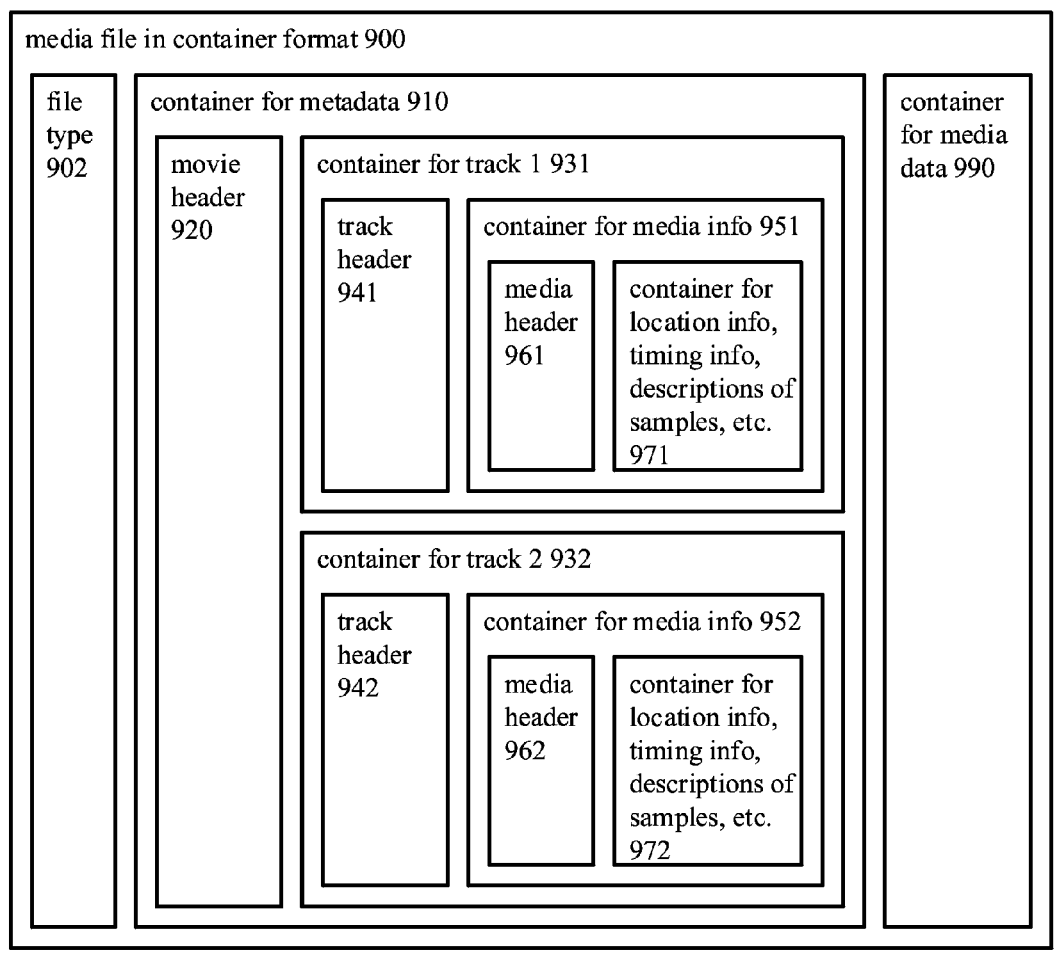
FIG. 9 is a diagram of hierarchically organized syntax elements defined according to a container format in a media file.

FIG. 9 shows an example media file 900 in a container format. The media file 900 is tree-structured, or hierarchically organized, including objects (sometimes called "boxes") that contain other objects and/or container format attributes. An object (box) typically includes a size (i.e., length) value and type value for the box, followed by other attributes and/or contained objects. A "container" is an object that contains and groups a set of other objects, but typically does not itself contain attributes (aside from size and type values). A container format syntax element can be an object (box) or attribute.

The media file 900 includes metadata for a presentation with audio content, video content, image content and/or other content. The presentation is logically divided into tracks such as a video track and audio track. For a track, each timed unit is a sample (e.g., a frame of video, frame of audio). Samples in a track are numbered. A track also has one or more sample descriptions. A sample in a track is tied to a description by reference, and the description for a sample indicates how the sample may be decoded.

For the media file 900, the physical structure of the file 900 is not tied to the physical structure and organization of the media content. That is, header information and other metadata about a sample need not adjoin encoded media content for the sample within the media file 900. Further, neither the physical structure of the media file 900 nor the layout of the encoded media content is tied to time ordering of the media samples. Instead, file structures and other syntax elements defined according to the container format specify the placement and timing of the media samples, e.g., with timestamps or another suitable timing designation. This facilitates seek operations and random access.

In FIG. 9, the media file 900 contains the file type 902, a container for metadata 910 and a container for media data 990. The file type 902 indicates the container format specification(s) to which the media file 900 conforms. The container for metadata 910 contains metadata for the presentation, and the container for media data 990 contains encoded media content for, e.g., samples of video and samples of audio. Alternatively, the encoded media content can be stored apart from the media file 900, with references within the media file 900 indicating locations for the encoded media content.

The container for metadata 910 contains a movie header 920 and two containers for tracks 931, 532). The movie header 920 contains syntax elements relevant to the entire presentation, such as duration, time scale, preferred playback rate and preferred volume. Each track container 931, 932) contains a track header 941, 942) and container for media information 951, 952). The track header 941, 942) contains syntax elements relevant for a track, such as a track identifier, duration and (for video) width, height and layer. The container for media information 951, 952) includes a media header 961, 962) and additional information 971, 972) for timing of samples, sample descriptions, location of chunks of encoded media content for samples, etc. For additional details about syntax elements in example container formats, see, e.g., ISO/IEC 14496-12, -14 and -15 or the CFF specification.

Alternatively, a media file includes other and/or additional container format syntax elements.

In view of the many possible embodiments to which the disclosed principles may be applied, it should be recognized that the illustrated embodiments are only preferred examples and should not be taken as limiting the scope of protection. Rather, the scope of protection is defined by the following claims. We therefore claim all that comes within the scope and spirit of these claims.

We claim:

1. In a computing device that implements an encoder, a method comprising: receiving an encoded video sequence with a file container; receiving a video trimming operation input to trim arbitrary desired pictures from the encoded video sequence to create a frame accurate target segment, wherein the frame accurate target segment begins with a P or B picture and is not limited to beginning with a clear start picture; wherein if the encoder supports use of changed parameter identifications, trimming to frame accuracy comprises creating new parameter identifications for each of a leading portion and a trailing portion, inserting the new parameter identifications in the leading portion and the trailing portion, re-encoding the leading portion and the trailing portion using the new parameter identifications, wherein the new parameter identifications are different from a parameter identification for an unchanged middle portion between the leading and trailing portions, and re-muxing the unchanged middle portion, without re-encoding, with the re-encoded leading and trailing portions, and wherein the method performs smart video editing so that only the arbitrary desired pictures are retained from the video sequence.

2. The computing device of claim 1, wherein trimming to frame accuracy comprises creating new parameter identifications for each of the leading portion and the trailing portion, inserting the new parameter identifications in the leading portion and the trailing portion, re-encoding the leading portion and the trailing portion using the new parameter identifications, wherein the new parameter identifications are different from a parameter identification for the unchanged middle portion.

3. The computing device of claim 1, wherein trimming to frame accuracy comprises creating a new sample description container in a multimedia container for the target segment.

4. The computing device of claim 1, wherein trimming to frame accuracy comprises creating a new sample description container in a multimedia container for the target segment, and wherein the new sample description container comprises (1) original parameter sets from an original sample description container, (2) new parameter sets different from the original parameter sets and having parameter identifications matching the original parameter sets, (3) the original parameter sets of (1) and the new parameter sets of (2) in combination, or (4) dummy parameter sets different from the original parameter sets and having parameter identifications matching the original parameter sets.

5. The computing device of claim 1, further comprising adjusting the timestamps of the pictures in the target segment to ensure playback in proper sequence and creating a new multimedia container to describe the re-encoded leading portion, the re-muxed middle portion and the re-encoded trailing portion.

6. In a computing device that implements an encoder, a method comprising:
receiving an encoded video sequence with a file container;
receiving input to execute a trimming operation to create a frame accurate target segment of one or more desired pictures from the encoded video sequence;
determining that an encoder to be used for re-encoding the leading portion and the trailing portion cannot support parameter identifications for a leading portion and a trailing portion that are different from a parameter identification for an unchanged middle portion between the leading portion and the trailing portion;
inserting a new parameter set with the same parameter identification for the leading portion and for the trailing portion together with respective clear start picture sample data;
trimming to frame accuracy by changing the parameters of the leading and trailing portions to have the new parameter set and the same parameter identification, using the changed parameters in re-encoding the leading and trailing portions and re-muxing the unchanged middle portion, without re-encoding, with the re-encoded leading and trailing portions.

7. The computing device of claim 5, wherein the new parameter set is inserted in and saved together with sample data after any parameter set present in sample data from the sample description container.

8. The computing device of claim 6, wherein trimming to frame accuracy comprises inserting a new clear start picture into the target sequence at a starting point of the target sequence.

9. The computing device of claim 6, further comprising determining a type of an encoder suited for re-encoding and specifying a hardware or software encoder.

10. The computing device of claim 5, wherein trimming to frame accuracy comprises creating a new sample description container and storing values in the sample description container sufficient to ensure compliance with MPEG-4 file format specification.

11. In a computing device that implements an encoder, a method comprising:
receiving an encoded video sequence with a file container;
receiving input to execute a trimming operation to create a frame accurate target segment of one or more desired pictures from the encoded video sequence;
trimming to frame accuracy by changing the parameters or the parameter identifications of leading and trailing portions, using the changed parameters or changed parameter identifications in re-encoding the leading and trailing portions, and re-muxing an unchanged middle portion between the leading and trailing portions, without re-encoding, with the re-encoded leading and trailing portions;
determining whether the encoder supports use of changed parameter identifications for the pictures in the leading portion and in the trailing portion that are different from original parameter identifications,
wherein if the encoder supports use of changed parameter identifications, trimming to frame accuracy comprises creating new parameter identifications for each of the leading portion and the trailing portion, inserting the new parameter identifications in the leading portion and the trailing portion, re-encoding the leading portion and the trailing portion using the new parameter identifications, wherein the new parameter identifications are different from a parameter identification for the unchanged middle portion, and
wherein if the encoder does not support use of changed parameter identifications, trimming to frame accuracy comprises creating a second set of parameters different from an original set of parameters for the unchanged middle portion and inserting the second set of parameters into the leading portion and into the trailing portion, wherein the original set of parameters and the second set of parameters have the same parameter identifications.

12. In a computing device that implements an encoder, a method comprising:
receiving an encoded video sequence with a file container;
receiving input to execute a trimming operation to create a frame accurate target segment of one or more desired pictures from the encoded video sequence; and
trimming to frame accuracy by changing the parameters or the parameter identifications of leading and trailing portions, using the changed parameters or changed parameter identifications in re-encoding the leading and trailing portions, and re-muxing an unchanged middle portion between the leading and trailing portions, without re-encoding, with the re-encoded leading and trailing portions,
wherein if the encoder does not support use of changed parameter identifications, then further comprising determining whether the leading portion and trailing portion contain an access unit delimiter, and if an access unit delimiter is present, then inserting the second set of parameters to follow the access unit delimiter.

* * * * *